(12) United States Patent
Wang et al.

(10) Patent No.: US 6,314,454 B1
(45) Date of Patent: Nov. 6, 2001

(54) METHOD AND APPARATUS FOR CERTIFIED ELECTRONIC MAIL MESSAGES

(75) Inventors: David Shan-Ming Wang, Fremont; P. Robert Hsu, San Jose, both of CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/108,177

(22) Filed: Jul. 1, 1998

(51) Int. Cl.[7] ...................................... G06F 15/16
(52) U.S. Cl. ...................... 709/206; 709/202; 709/213; 709/217; 709/218; 358/402; 358/403
(58) Field of Search .......................... 709/206, 200–203, 709/205, 213, 217–219, 227–228, 237–238; 379/93, 100; 358/400–407

(56) References Cited

U.S. PATENT DOCUMENTS

| | | | |
|---|---|---|---|
| 5,057,935 | * 10/1991 | Williams | 358/402 |
| 5,138,653 | 8/1992 | Le Clercq | 379/93.24 |
| 5,325,310 | * 6/1994 | Johnson et al. | 709/206 |
| 5,500,893 | 3/1996 | Onosaka | 379/396 |
| 5,568,551 | 10/1996 | Kawashima | 705/53 |
| 5,572,643 | 11/1996 | Judson | 709/218 |
| 5,675,733 | * 10/1997 | Williams | 709/206 |
| 5,790,790 | * 8/1998 | Smith et al. | 709/206 |
| 5,815,555 | * 9/1998 | Cairo | 379/93.07 |
| 5,832,220 | * 11/1998 | Johnson et al. | 709/206 |
| 5,930,479 | * 7/1999 | Hall | 709/206 |
| 5,953,396 | * 9/1999 | Kong | 379/93.12 |
| 5,958,005 | * 9/1999 | Thorne et al. | 709/202 |
| 6,049,823 | * 4/2000 | Hwang | 709/218 |

* cited by examiner

Primary Examiner—Bharat Barot
(74) Attorney, Agent, or Firm—Finnegan, Henderson, Farabow, Garrett, & Dunner, L.L.P.

(57) ABSTRACT

A system allows users to send certified electronic mail messages. A server receives an electronic mail message designated for certified delivery. The server forwards the electronic mail message to a receiving account. Any action taken upon the message by the receiving account is conveyed to the server, which forwards that information to the sender.

19 Claims, 10 Drawing Sheets

FIG. 9

Certified EmailBox:

| To | Subject | Sent | Recipient Action | Time of Action |
|---|---|---|---|---|
| John Smith <jsmith@umich.edu> | Test next week | 6/6/97 8:55 | Del w/o Open | 6/7/97 13:55 |
| Joan Adams <joan14@aol.com> | Happy Birthday! | 6/7/97 14:23 | Opened | 6/7/97 15:33 |
| | | | Saved | 6/8/97 15:38 |
| | | | Replied | 6/8/97 8:14 |
| | | | Deleted | 6/15/97 23:59 |
| Ben Williams <73421.1320@compuserve.com> | Trip to Vegas | 6/8/97 23:55 | Opened | 6/9/97 7:23 |
| | | | Forwarded | 6/9/97 7:30 |
| | | | Deleted | 6/15/97 17:16 |
| George Simpson <gsimp@snapweb.com> | Trip to Vegas | 6/8/97 23:55 | Filtered | 6/8/97 23:58 |
| Chris Hill <chill@ssl.sel.sony.com> | Meeting tomorrow | 6/9/97 12:00 | Opened | 6/9/97 12:33 |
| | | | Replied | 6/10/97 7:55 |
| | | | Deleted | 6/10/97 7:59 |
| Amanda Fox <afox@ssl.sel.sony.com> | Meeting tomorrow | 6/9/97 12:00 | Opened | 6/9/97 12:57 |
| | | | Deleted | 6/9/97 13:01 |
| Brittany Smart <bsmart@ssl.sel.sony.com> | Meeting tomorrow | 6/9/97 12:00 | Opened | 6/10/97 9:12 |
| | | | Replied | 6/10/97 9:18 |
| | | | Saved | 6/10/97 9:20 |

Current Email States: (From RFC 2060 - IMAP 4rev1)

/Seen - message has been opened (& presumably read).
/Answered - message has been replied to.
/Flagged - message has been designated for special attention.
/Deleted - message has been designated for removal by the next "expunge" command.
/Draft - message composition is incomplete; not ready to be sent.
/Recent - message has been newly received; not yet read.

METHOD AND APPARATUS FOR CERTIFIED ELECTRONIC MAIL MESSAGES

BACKGROUND OF THE INVENTION

A. Field of the Invention

This invention generally relates to electronic mail systems and, more particularly, to methods and apparatus for employing certified email messages.

B. Description of the Related Art

The past several years have seen a dramatic shift in methods of communicating information. In the past, the only way of communicating information was via standard mail delivery of handwritten or typed documents. With the advent of the telephone and telegraph, it became possible to convey voice signals and information electrically. Recently, electronic communication has become a rapidly increasing way of conveying information—especially because of widely available access to the Internet. People now exchange electronic mail ("email") addresses concurrently with telephone numbers, and many major businesses provide access to information and services on the Internet via sites on the World Wide Web.

Because of the rapid pace of development in this field, however, the evolution has not been completely seamless. Although it is now possible to communicate audio/visual information electronically, it is certainly not easy to do so. Simply to send and receive email, a user initially must purchase a computer system, configure all of its component parts to interoperate, learn the operating system for the computer, contract with an Internet service provider, and learn how to use the application software for email. If a user wants to send audio-visual information such as a picture, video sequence or audio, the user is forced to purchase even more hardware and learn even more software.

A conventional computer system is shown in FIG. 1. A computer system 100 is used to compose and transmit email, generally by dial-up telephone connection, to an Internet service provider (ISP) 180. ISP 180 contains a mail server 190, which is responsible for receiving email and routing it to the appropriate destination address.

Computer system 100 consists of a computer 130, to which are attached several accessories. Computer 130 may be any conventional home or business computer such as a personal computer (PC), a Macintosh, a network computer, or a Sun Workstation. The user interface to computer 130 includes a keyboard 140, some type of pointing device such as a mouse 150, and a display screen 120. In addition to a user interface, computer system 100 may also contain an offline storage device 110 for storing messages to be sent and messages that have been received. Typical offline storage devices include a hard disk drive, a floppy disk drive, or a tape unit. A typical computer system 100 also contains a modem 160 which is employed to send or receive messages between computer system 100 and ISP 180.

To send a email message, a user enters a message into computer 130 via keyboard 140 and/or mouse 150. This email message may or may not then be stored on offline storage device 110. The email message is then transmitted from computer 130 to ISP 180 via modem 160. Upon receiving the message, mail server 190, within ISP 180, forwards the message to the appropriate destination. In this manner, a user of computer system 100 may transmit a email message to any user that is connected to ISP 180, either directly or indirectly via the Internet.

A user desiring to transmit an email message containing audio-visual information must further employ an audio-video input interface 170. To this interface 170 a user may attach an audio-visual source such as, for example, a video cassette recorder (VCR) or a camcorder. To transmit an audio-visual email message, audio-visual information is transferred from the audio-visual source to computer 130 via interface 170, and converted to an appropriate format such as MPEG. This information may or may not be stored offline on storage device 110. The information is then composed into an email message and is transmitted from computer 130 to ISP 180 via modem 160. Mail server 190 of ISP 180 forwards it to the appropriate destination.

As the preceding explanation demonstrates, composing and transmitting an email message on a conventional computer system requires numerous hardware components and significant user sophistication. This complexity creates a barrier to entry that prevents many individuals from participating in the information age.

Recent developments have sought to address the problem noted above. Companies now provide a service that allows an individual to purchase a relatively inexpensive "set-top box," which is connected to a television receiver to access the Internet. As a result, individuals now have somewhat easier access to the Internet and a simpler way of sending and receiving email.

A representative example of such a set-top system is shown in FIG. 2, and is commercially available from WebTV. Such a system consists of a set-top box 220 which is connected to a conventional television receiver 200. Also attached to television receiver 200 may be a video signal source 210 such as, for example, a VCR or a camcorder.

A user of such a system may compose a email message by using remote control 230 in conjunction with set-top box 220. This may be accomplished by using a wireless keyboard (not shown). Alternatively, set-top box 220 may generate a display of the alphabet, which is shown on television receiver 200. By employing remote control 230, the user selects individual letters of the displayed alphabet to compose words, phrases, or sentences. During this composition, the email message being created is stored in a memory of set-top box 220. Once the message has been fully created, it is transmitted from set-top box 220 to a WebTV system 240. This transmission is performed using a conventional modem and dial-up telephone lines. Once the message reaches WebTV system 240, a WebTV mail server 250 forwards the message to the appropriate destination.

Problems remain, however, despite the availability of such set-top systems. Neither set-top systems nor computer systems contains a robust email management system designed with home users in mind. For example, although these systems provide a way to send and receive text information, they do not allow the user to manipulate audio-visual information. Moreover, neither the computer system nor the set-top system provides users the ability to monitor the status of transmitted email messages. For example, a user cannot receive notification of the action taken by the receiving account on previously transmitted email messages.

There exists, therefore, a need for a versatile but simple form of electronic communication that is readily accessible to the general public. To provide versatility, the system should accommodate text, audio, video, and a robust email system; it should also employ an open architecture so that individuals may use whatever Internet service provider they prefer. To provide simplicity, the system should be integrated, rather than having multiple components that its user needs to purchase separately and then assemble together; it should also employ familiar hardware that requires simple commands.

The present invention helps to satisfy this need and solve the problem of providing a simple but versatile form of electronic communication. It provides methods and apparatus that allow its users to manipulate, send, and receive audio/visual information easily by using familiar devices such as an interactive receiver and a remote control device. In particular, the present invention is directed to methods and apparatus for employing certified email messages; this allows its users to receive notification of the action taken upon their previously transmitted email messages by the recipients of the messages.

SUMMARY OF THE INVENTION

Consistent with this invention, one method for providing certified email comprises the steps of using an interactive receiver to generate a certified email message from the sending account and sending the certified email message to a mail server. The mail server delivers the certified email message to the receiving account, and receives, from the receiving account, notification of the action taken upon the certified email message. The server then notifies the interactive receiver of the action taken on the certified email message by the receiving account.

Although this method has been described here as an example, one skilled in the art will recognize that there exist other methods and apparatus that are consistent with the claimed invention.

BRIEF DESCRIPTION OF THE DRAWINGS

The accompanying drawings, which are incorporated in and constitute a part of this specification, illustrate the invention and, together with the description, serve to explain the principles of the invention.

The accompanying drawings, which are incorporated in and constitute a part of this specification, illustrate the invention and, together with the description, serve to explain the principles of the invention.

FIG. 9 is a sample list of notifications that a sender of certified email may receive; and FIG. 10 is an exemplary list of types of notifications that the sender of certified email may obtain.

DESCRIPTION OF THE PREFERRED EMBODIMENTS

Reference will now be made in detail to an implementation of the present invention as illustrated in the accompanying drawings. Wherever possible, the same reference numbers will be used throughout the drawings and the following description to refer to the same or like parts.

A. Overview

Systems consistent with the claimed invention overcome the limitations associated with the computer and set-top systems and provide a simple yet versatile way to employ a certified email system. A sender uses an interactive receiver to compose an email message containing text, audio, video data, or any combination thereof. The sender designates it for certified delivery and transmits it to an ISP. A proprietary mail server attached to the ISP recognizes the message as being certified and stores it for delivery to the recipient. Upon request, the mail server transmits the message to the recipient. When the recipient takes some action upon the message—such as opening, deleting, or forwarding the message—the recipient also transmits to the mail server notification of the action taken. The mail server stores this information in a database, and, upon request, notifies the sender of the action taken upon the certified email message by the recipient.

B. System Diagrams

Figure 1:
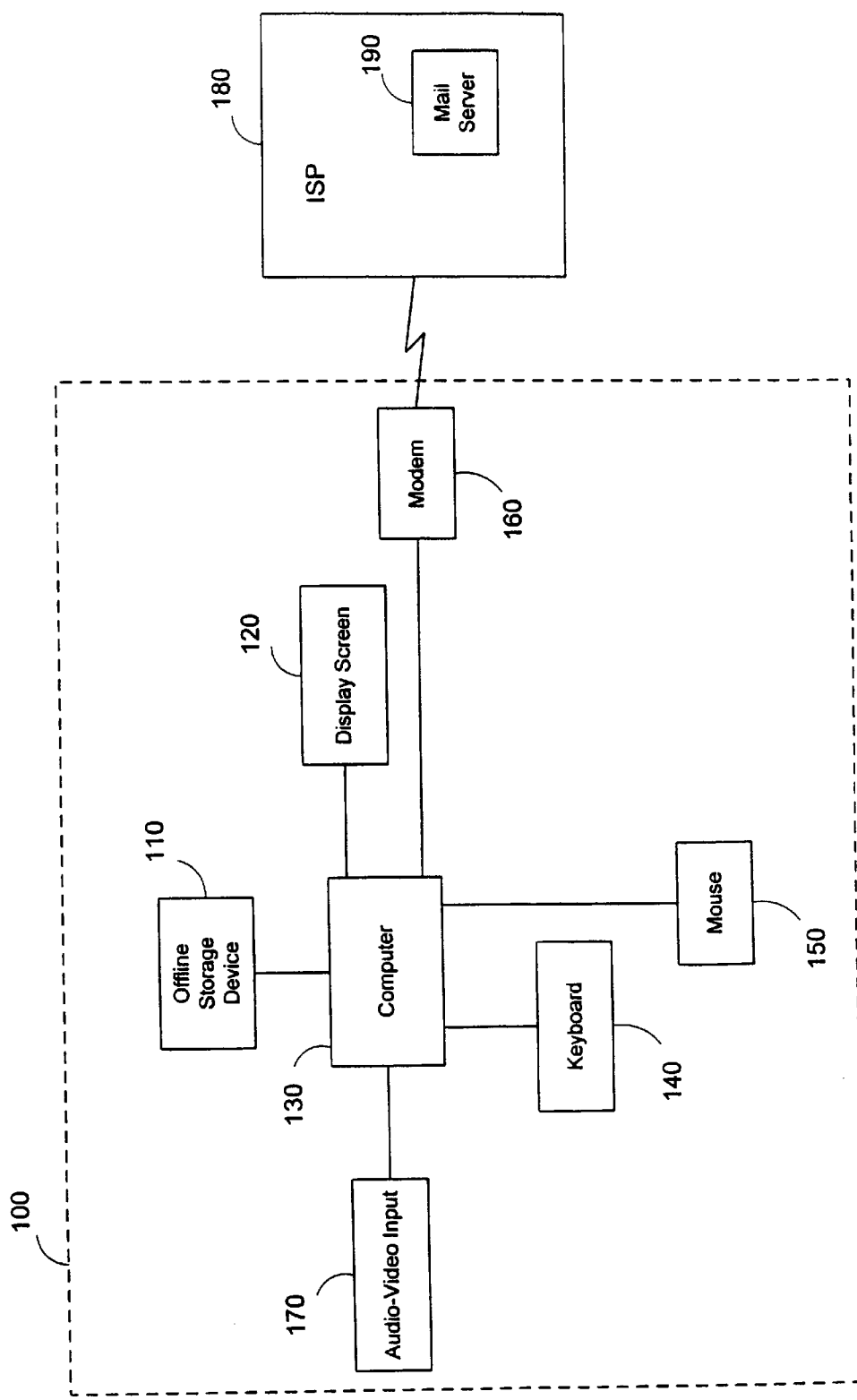
FIG. 1 is a block diagram of a conventional computer system for electronic communication.
Figure 2:
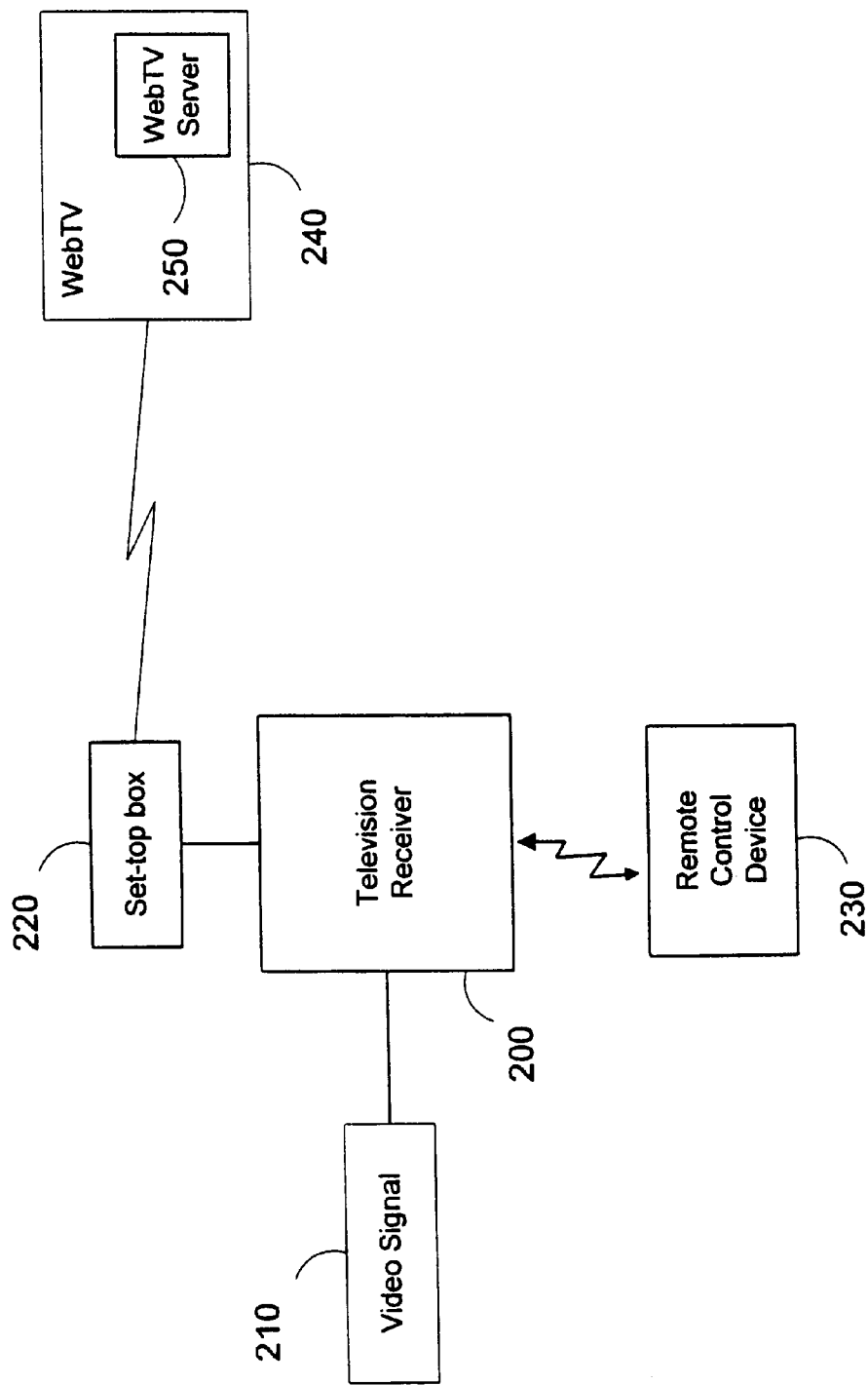
FIG. 2 is a block diagram of a conventional set-top system for electronic communication.
Figure 3:
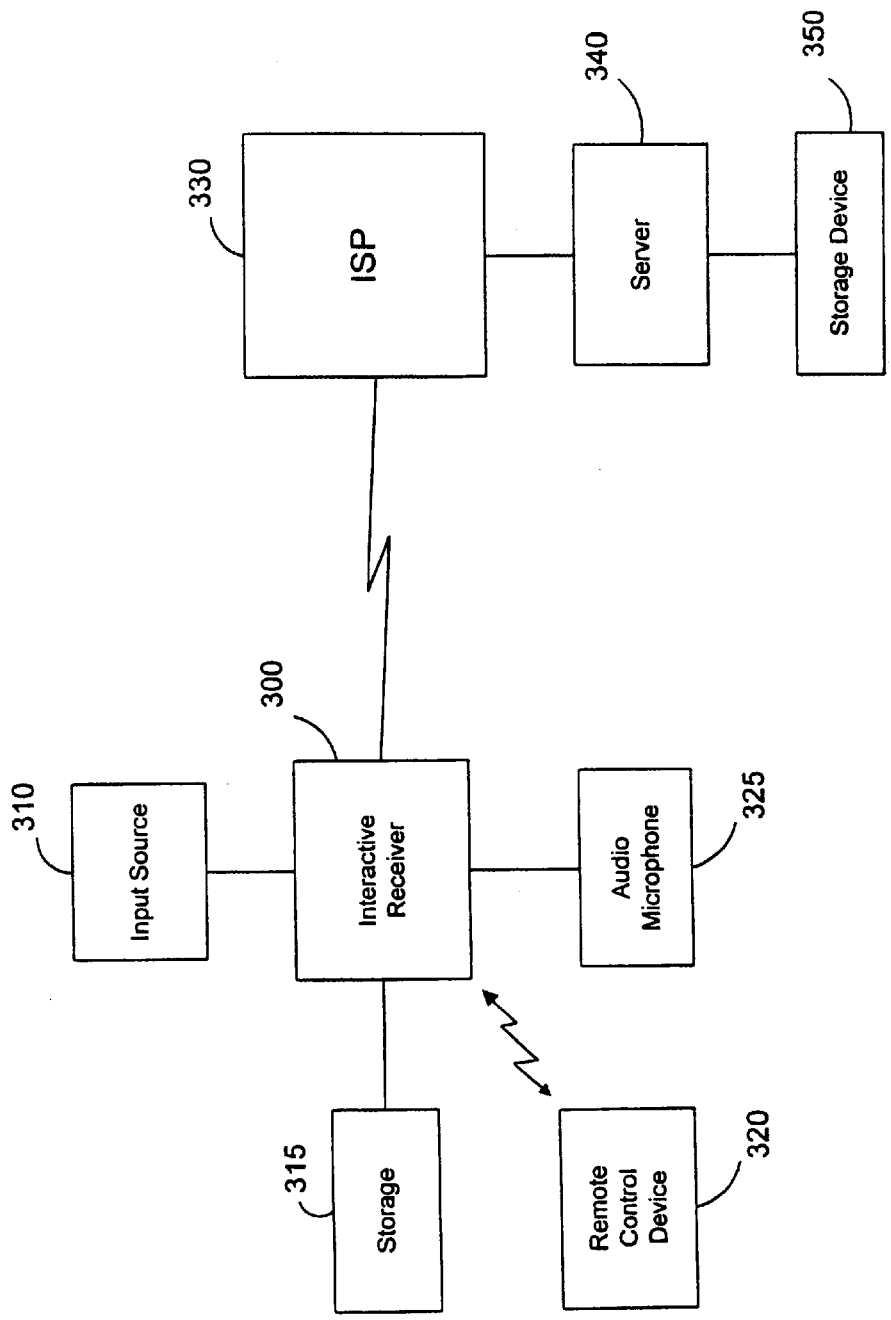
FIG. 3 is a block diagram of a system, consistent with the claimed invention, for certified email.

One example of such a system is shown in FIG. 3. This system consists of an interactive receiver 300 and ISP 330, each of which has other components interfaced to it. In a preferred embodiment, interactive receiver 300 may be similar to a conventional television receiver, with additional features as described below. Connected to interactive receiver 300 are an input source 310, a storage 315, a remote control device 320, and an audio microphone 325. Examples of input source 310 include, but are not limited to, a VCR, a digital still camera, or a camcorder. Examples of storage device 315 include, but are not limited to, a hard disk drive, a digital video drive, an analog tape drive, or a random access memory. Examples of remote control device 320 include, but are not limited to, a television remote control device, or a conventional QWERTY keyboard.

The system also contains a server 340 that is connected to ISP 330. Attached to server 340 is a storage device 350, examples of which include a hard disk, an analog tape drive, or a random access memory. Server 340 is a conventional network mail server computer but contains the software and hardware necessary to manage a system consistent with the claimed invention. This includes, for example, database software to track the status of certified email messages. Server 340 and storage device 350 operate in conjunction with ISP 330 to manage the certified email messages, which includes delivering the message and notifying the sender of any action taken on it by the recipient.

The system shown in FIG. 3 allows the user to simply compose, transmit, and track certified email messages. Moreover, as the system shown in FIG. 3 also demonstrates, a user of such a system is not limited to a specific ISP, as is the case with conventional systems. Any ISP that chooses to use proprietary server 340 may provide its users with this system's capabilities. This open architecture approach provides significant flexibility to users, who may select any ISP of their liking, so long as that ISP supports this system.

Although FIG. 3 shows one example of a system that allows a user to compose and transmit certified email messages, those skilled in the art will recognize that there exist other systems that are also consistent with the claimed invention. For example, although FIG. 3 shows server 340 and storage device 350 as being separate from ISP 330, any number of these components may be combined.

Figure 4:
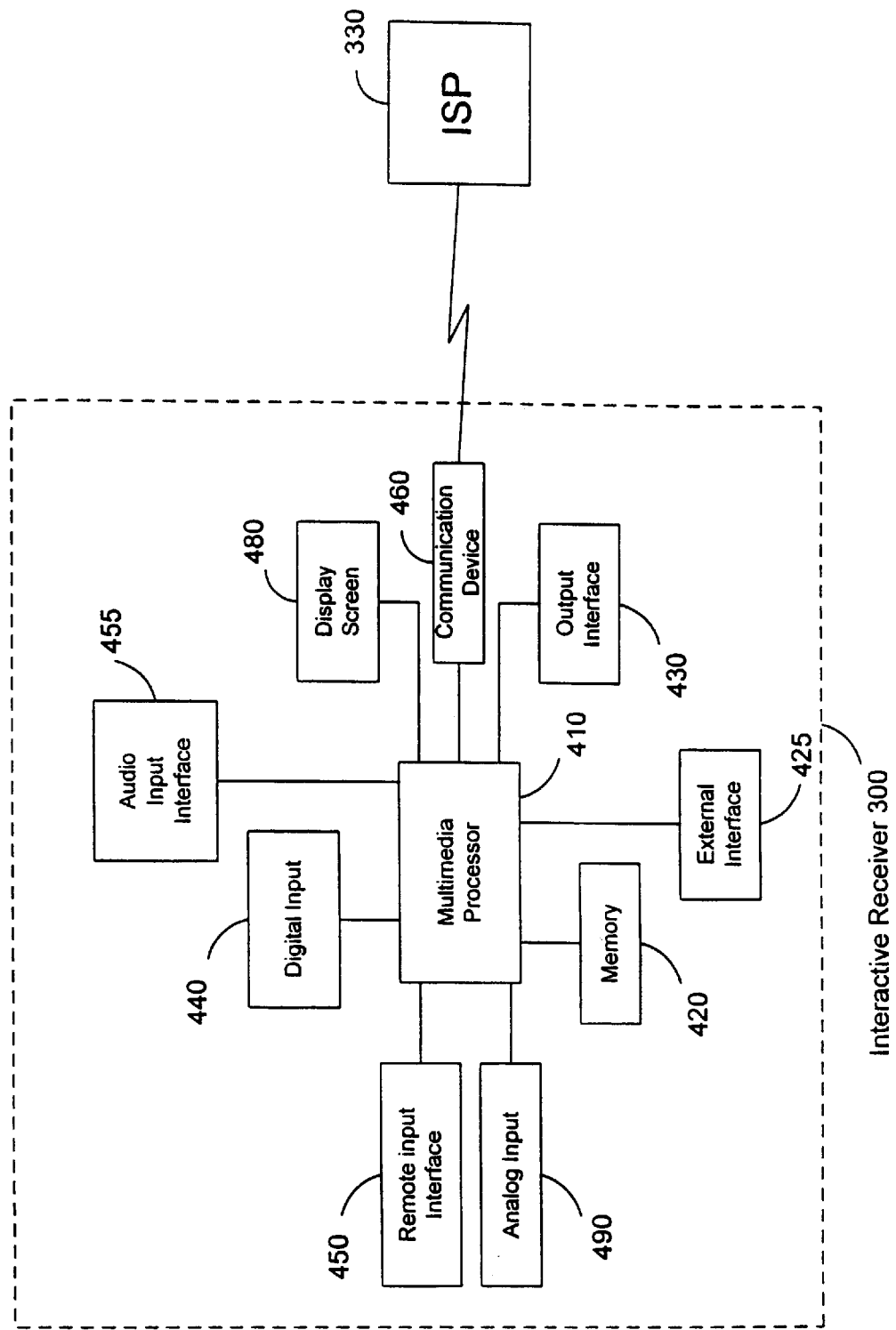
FIG. 4 is a block diagram, consistent with the claimed invention, of an interactive receiver.

FIG. 4 shows a block diagram, consistent with the claimed invention, of the portion of the system responsible for composing a certified email message, namely, interactive receiver 300. Interactive receiver 300 shown in this diagram contains a multimedia processor 410, examples of which include the Pentium MMX™ processor commercially available from Intel Corporation and the Tri-media™ processor commercially available from Philips Corporation. Processor 410 provides support for audio-visual information, graphic information, a network stack, and a user interface, and is configured to carry out the steps described below in reference to FIGS. 7 to 10.

Attached to processor 410 is an analog input 490 and a digital input 440. Input 490 may receive television broadcast information from, for example, a television antenna or a cable television system. Accordingly, input 490 supports standards such as National Television Standards Committee (NTSC). Input 440 may receive information from, for example, digital cable television systems or digital satellite systems. Accordingly, input 440 supports standards such as Quadrature Amplitude Modulation for digital cable and Quadrature Phase Shift Keying for digital satellite systems.

Also attached to processor 410 is an output interface 430 for sending video data from interactive receiver 300 to, for example, a VCR, a digital video drive, or a video printer. In addition to output interface 430, there is attached to processor 410 a display screen 480 for displaying audio-visual and text information to the user. Examples of display screen 480 include a cathode ray tube, a liquid crystal display, or a plasma display.

Also attached to processor 410 is a remote input interface 450 for receiving commands, such as infrared or radio frequency signals, from remote control device 320. In addition, an audio input interface 455 is attached to processor 410, which enables the user to add audio to text or graphic images. Interactive receiver 300 also contains an external interface 425 for communicating with external devices such as offline storage device 315. Examples of external interface 425 include, but are not limited to, the Small Computer System Interface (SCSI), IEEE 1394 ("Firewire"), and Electronics Industry Association Recommended Standard 232. A memory device 420 is attached to processor 410 for storing information. Examples of memory device 420 include, but are not limited to, a hard disk, a random access memory, a flash memory, or a floppy disk.

Also shown in this example is a communication device 460, which represents any device capable of communicating electronic information between multimedia processor 410 and ISP 330. Device 460 may operate over telephone lines using conventional standards such as V.34 or Integrated Services Digital Network (ISDN). Alternatively, device 460 may be a cable modem operating over coaxial cable.

Although FIG. 4 shows one example of an interactive receiver, those skilled in the art will recognize that there exist other devices that are also consistent with the claimed invention. For example, the components shown in FIG. 4 may be integrated into a digital television receiver cabinet. Alternatively, some of the components may be integrated into a television receiver cabinet while others remain externally attached.

Figure 5:
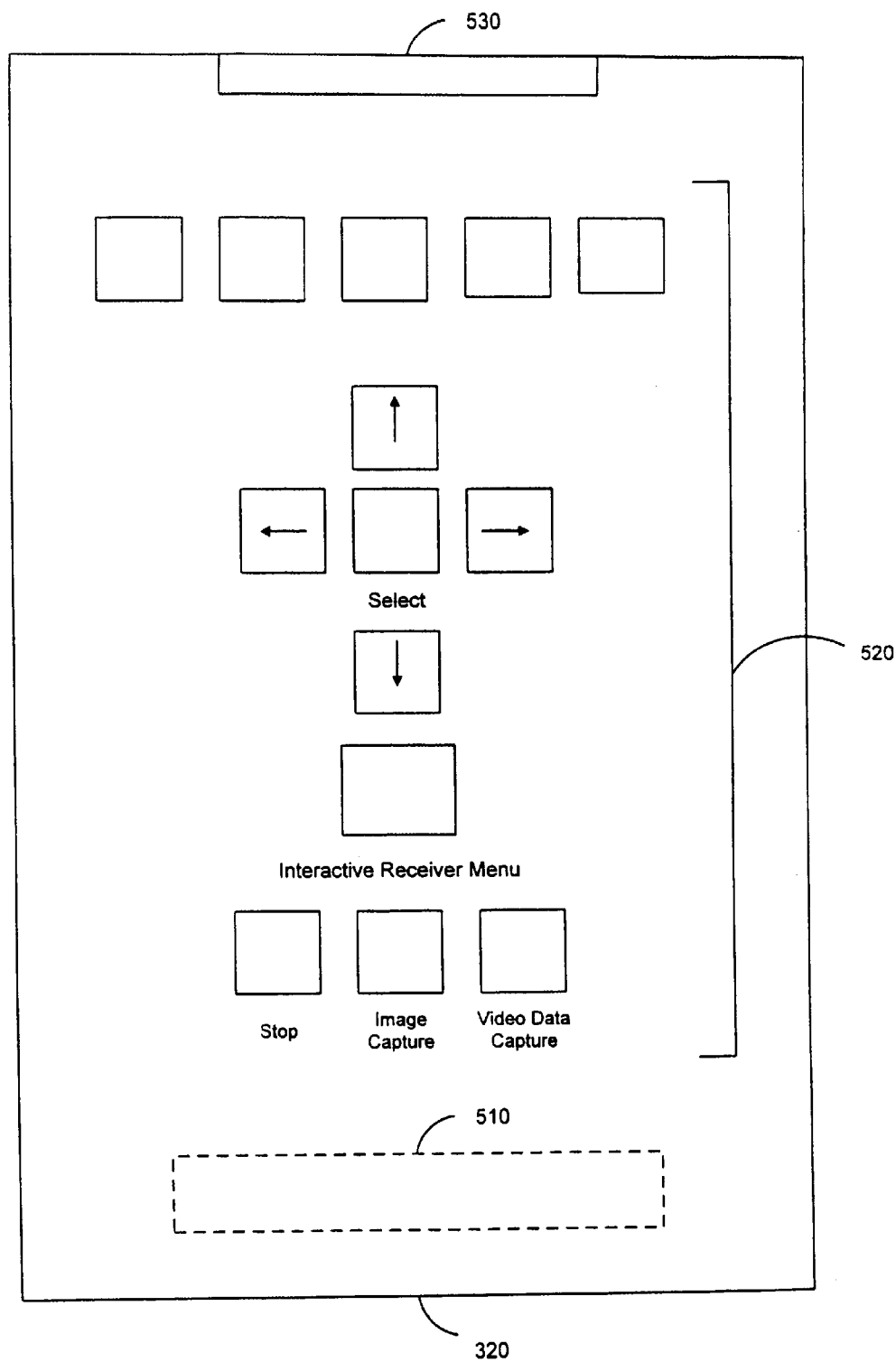
FIG. 5 is a diagram of a remote control device that may be used in conjunction with the claimed invention.

FIG. 5 shows a diagram of a remote control device that may be used in conjunction with the claimed invention. Remote control device 320 is powered by batteries 510 contained within the device. Remote control device 320 also contains numerous user control keys 520. In addition to providing routine television control, such as changing television channels or volume levels, remote control device 320 also contains keys for displaying a menu, cursor control keys for selecting menu items, and keys for initiating and ending the capture of video data. These are shown in FIG. 5 as: an "Interactive Receiver Menu" key, which is used to display a menu; arrow and "Select" keys for manipulating menu items; an "Image Capture" key for initiating a graphic image capture; a "Video Data Capture" key for initiating a video sequence capture; and a "Stop" key for ending the capture of video data. Remote control device 320 also contains an infrared transmitter 530 for conveying commands from remote control device 320 to interactive receiver 300. The channel of communication between remote control device 320 and interactive receiver 300 is not critical. In addition to infrared signals, one may use any other conventional technique such as RF signals or a physical cable.

Although FIG. 5 shows one example of a remote control device, those skilled in the art will recognize that there exist other remote control devices that are also consistent with the claimed invention. For example, remote control device 320 could be a conventional QWERTY keyboard.

Figure 6:
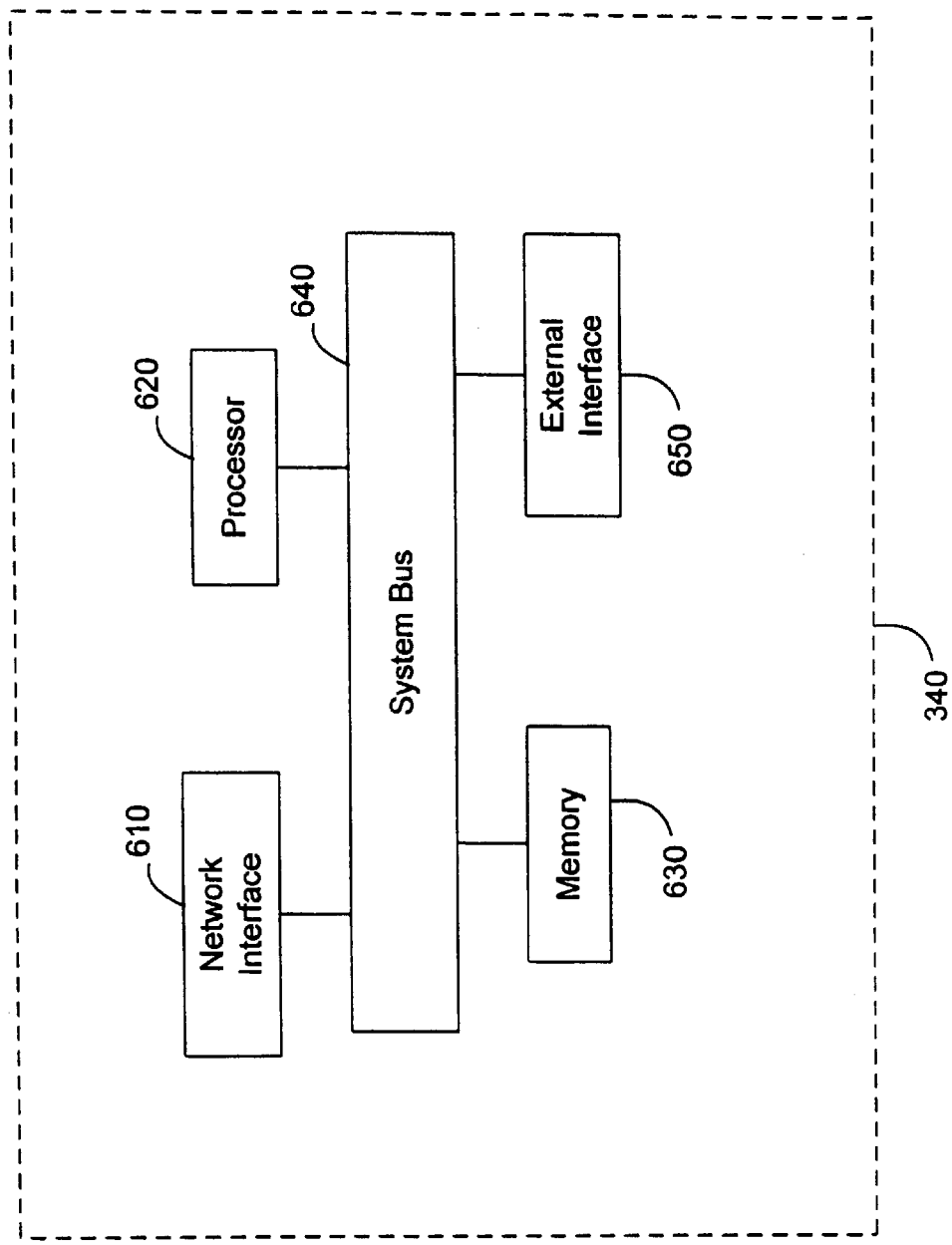
FIG. 6 is a block diagram, consistent with the claimed invention, of a mail server.

FIG. 6 is a block diagram, consistent with the claimed invention, of server 340. Server 340 includes multiple components that are all interconnected by a system bus 640. The system bus 640 may be a conventional PCI bus, such as those used in personal computers. Attached to system bus 640 is a processor 620, such as the Intel Pentium MMX processor. Processor 620 may be configured via software to perform the tasks (described below in reference to FIG. 8) necessary to provide a certified email system. Also attached to system bus 640 is a network interface 610. Examples of such an interface include an RS-232 connector for serial data, a modular telephone jack for dial-up connections, or a BNC connecter for Ethernet networks. Server 340 also includes a memory 630, such as a random access memory. The diagram also depicts external interface 650, which may be an SCSI interface, and which allows server 340 to interface with other external devices such as storage device 350 (FIG. 3).

A user of a system consistent with the claimed invention purchases an interactive receiver, such as interactive receiver 300. Interactive receiver 300 supports one master account for each home, the master account having multiple user sub-accounts. A user connects interactive receiver 300 to an alternating current power source, and connects modem 460 to a standard telephone line.

C. Flow Diagrams

Figure 7:
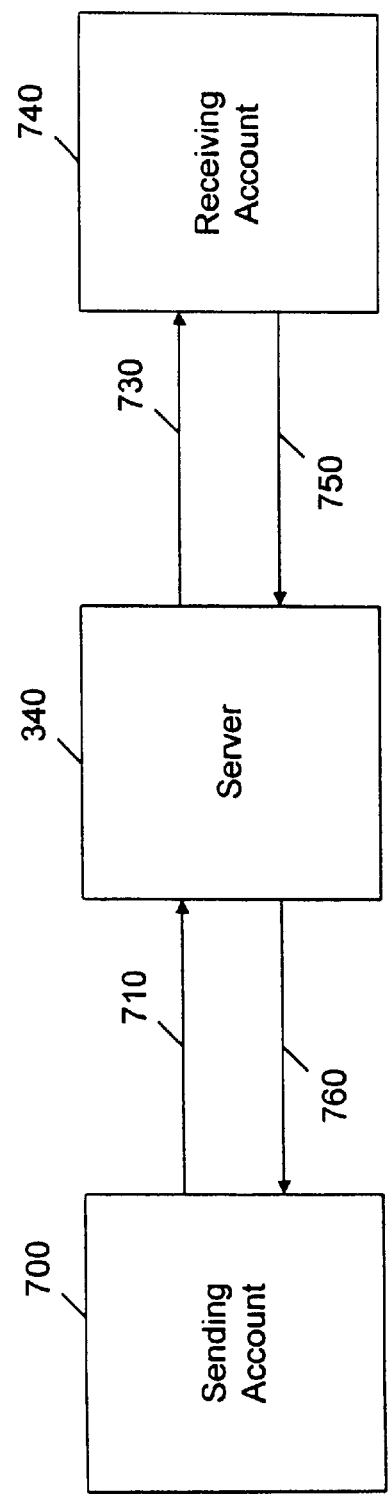
FIG. 7 is a diagram of the information flow between a sending account, a mail server, and a receiving account.

FIG. 7 is a diagram of the information flow between a sending account, a server, and a receiving account. This diagram includes a sending account 700, server 340, and a receiving account 740. A certified email message created by sending account 700 and destined for receiving account 740 first travels from sending account 700 to mail server 340 (arrow 710), where it is stored. At some point, receiving account 740 logs in to server 340 and is notified that it has mail waiting. At the request of receiving account 740, mail server 340 forwards the certified email message to receiving account 740 (arrow 730). At a later point, receiving account 740 takes some action on the certified email message, such as reading it, or deleting it. This action is communicated from receiving account 740 to mail server 340 (arrow 750). Mail server 340 logs this action in a database, and notifies sending account 700 of the action (arrow 760).

Figure 8:
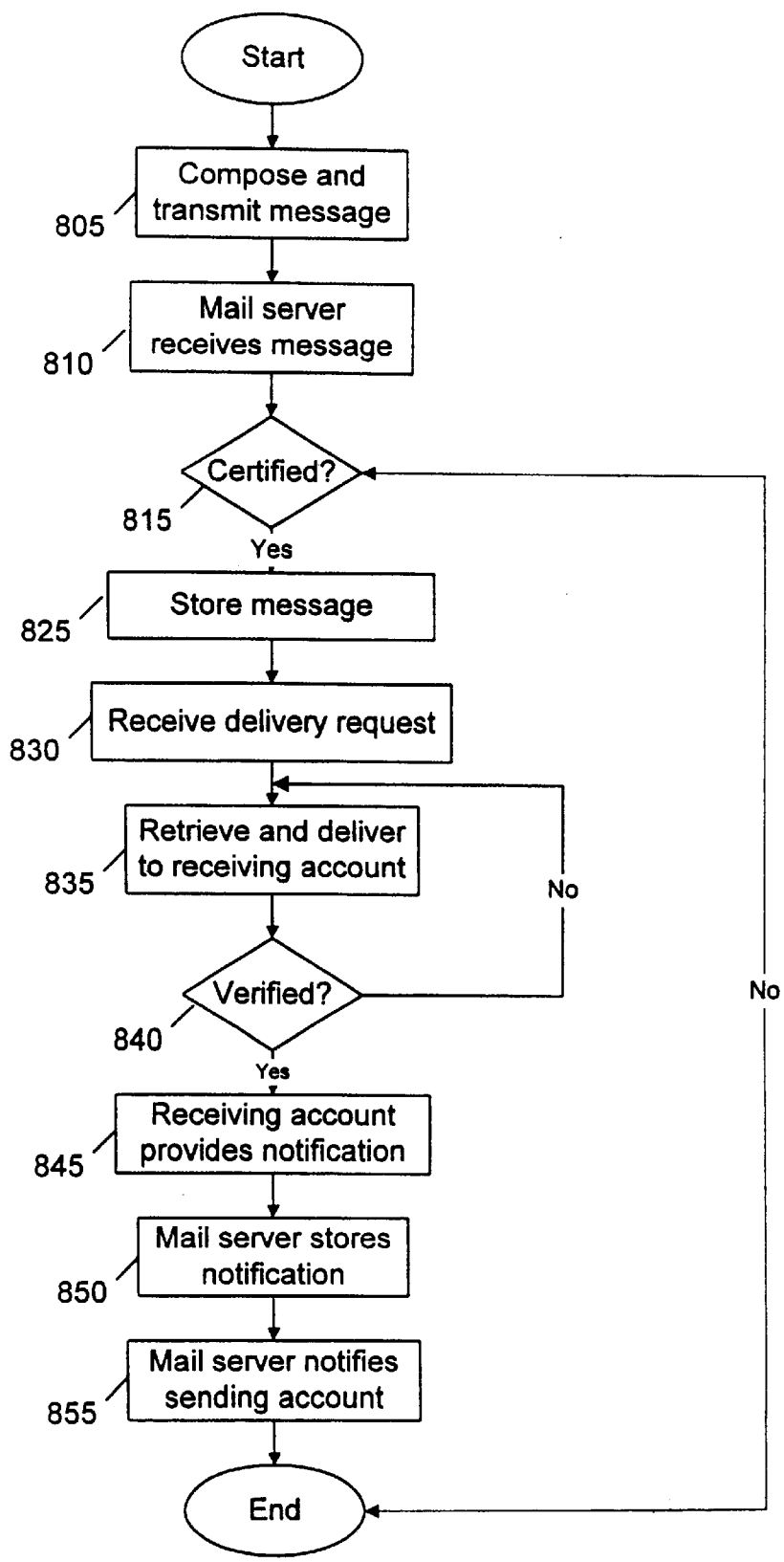
FIG. 8 is a flow diagram, consistent with the claimed invention, of the steps performed to employ a certified email system.

FIG. 8 is a flow diagram, consistent with the claimed invention, of the steps performed to employ a certified email message system. After the process begins, a user at the sending account composes and transmits a certified email message (step 805). The user may compose such a certified email message by using a conventional keyboard connected to either external interface 425 or remote input 450. After composing the message, the user transmits the message via device 460. The message first travels to ISP 330, which in turn routes the message to server 340. Server 340 receives this certified email message (step 810) through its network interface 610. Upon receiving the email message, server 340 checks to determine whether or not it is a certified email message (step 815). If it is not, server 340 treats it as a routine email message, and the process ends. On the other hand, if the mail message is certified, then server 340 stores the email message in either its memory 630, or in storage device 350 via external interface 650 (step 825).

At some later time, server 340 receives a request from receiving account 740 to deliver any email messages destined for receiving account 740 (step 830). In response to this request, server 340 retrieves the certified email message either from memory 630 or from storage device 350 via external interface 650, notifies receiving account 740 that there exist a certified email message, and queries receiving account 740 as to whether or not it accepts delivery of the message. Assuming that receiving account 740 accepts delivery, server 340 delivers the certified email message to receiving account 740 via network interface 610 (step 835). After transmitting the certified email message, server 340 verifies receipt of the message by receiving account 740 (step 840). If the certified email message was not properly received, server 340 re-delivers the message (step 835). The next time sending account 700 logs in to server 340, server 340 notifies sending account 700 as to whether or not receiving account 740 accepted delivery of the certified email message.

Assuming that the certified email message was properly received, receiving account 740 takes action on the email message at some later time. This action may include, for example, opening and reading the message, deleting the message, or forwarding the message to another user. When this occurs, receiving account 740 provides notification to server 340 of the action taken (step 845). Server 340 receives this notification via network interface 610, and stores it in its database (step 850). When sending account 700 next logs in to server 340, server 340 transmits to sending account 700 via network interface 610 notification of the action taken on the message by receiving account 740 (step 855).

As FIG. 8 demonstrates, server 340 does not simply act as a passive conduit between sending account 700 and receiving account 740, as occurs in conventional systems. Instead, server 340 actively participates with the two accounts to effectuate a certified email system. By the same token, FIG. 8 represents only one approach for employing a certified email message system, and those skilled in the art will recognize that there exist other ways of doing so that are consistent with the claimed invention. For example, although FIG. 8 shows only one certified email message, the system is designed to accommodate multiple messages. Moreover, server 340 may be configured to notify sending account 700 only of selected actions taken upon the certified email messages.

FIG. 9 shows a sample list of notifications that a sender of certified email may receive. A first column of the list 910 indicates the receiving account for the certified email message. In the diagram, the receiving account is identified by the person's name and email address. Thus, the receiving account for the first message is John Smith, whose email address is "jsmith@umich.edu."

A second column 920 indicates the subject for each of the certified email messages. For example, the subject of the first message sent to John Smith is "Test next week." A third column 930 indicates the date and time at which each message was sent. The first message in the diagram was sent on Jun. 6, 1997 at 8:55 a.m. A fourth column 940 indicates the action taken upon the certified email message by receiving account 740. The diagram indicates that the first message was "Del w/o Open," which explains that it was deleted without being opened and read. The diagram further indicates that the second message was "Opened," then "Saved," then "Replied" to, and finally "Deleted." Finally, a fifth column 950 indicates the date and time for each action taken by receiving account 740. For example, the second message was opened on Jun. 7, 1997 at 3:33 p.m., and deleted on Jun. 15, 1997 at 11:59 p.m.

By viewing such a list, sending account 700 may easily track the certified email messages it previously transmitted, and the actions taken thereupon by receiving account 740. FIG. 9 represents only one example of a list of notifications received by sending account 700 for messages previously transmitted to receiving account 740. Those skilled in the art will recognize that there exist numerous other lists, consistent with the claimed invention, for conveying this or similar information.

FIG. 10 is a list of the "states" (i.e., actions taken upon a message by a receiving account) currently supported by Internet mail, as explained in RFC 2060-IMAP 4rev1. The claimed invention, however, is not limited to only those states currently supported. For example, the sending account may want to know whether the certified email message was forwarded or sent to another user. Similarly, the sending account may desire notification as to whether the message was filtered out, or deleted without first being opened. Any such desired state information may be provided by either modifying the currently available Internet mail software, or writing new mail protocol software.

D. Conclusion

Methods and apparatus consistent with the invention provide certified email messages, which allows users to receive notification of the action taken upon their previously transmitted email messages by the recipients of the messages. Methods and apparatus consistent with the present invention may be implemented in software, hardware, or a combination of hardware and software. Software implementations of the invention are preferably embodied in a computer-readable media, such as a magnetic disk, or transferred over computer-readable media, such as the Internet. It will be apparent to those skilled in the art that various modifications and variations can be made in the methods and systems consistent with the present invention without departing from the spirit or scope of the invention.

What is claimed is:

1. In a system for sending and receiving email using an interactive receiver and having at least one sending account and at least one receiving account, a method for providing certified email comprising the steps of:

using an interactive receiver to generate a certified email message from the sending account;

sending the certified email message to a mail server configured to store certified email messages;

storing the certified email message in a storage device associated with the mail server;

receiving a request from the receiving account to access the certified email message;

delivering the certified email message from the mail server to the receiving account;

receiving, from the receiving account to the mail server, notification of an action taken upon the certified email message; and selectively notifying the sending account of the action taken on the certified email message by the receiving account.

2. In a system for sending and receiving email using an interactive receiver and having at least one sending account and at least one receiving account, a method for providing certified email comprising the steps of:

receiving at a mail server that is configured to store certified email messages a certified email message from the sending account;

storing the certified email message in a storage device associated with the mail server;

receiving a request from the receiving account to access the certified email message;

delivering the certified email message from the mail server to the receiving account;

receiving, by the mail server from the receiving account, notification of an action taken by the receiving account upon the certified email message;

storing the notification in a database associated with the mail server; and selectively notifying the sending account of the action taken on the certified email message by the receiving account, whereby the interactive receiver is operative to receive broadcast information.

3. In a system for sending and receiving email using an interactive receiver and having at least one sending account and at least one receiving account, a method for providing certified email comprising the steps of:

receiving at a mail server that is configured to store certified email messages a certified email message from the sending account;

storing the certified email message in a storage device associated with the mail server;

receiving a request from the receiving account to access the certified email message;

delivering the certified email message from the mail server to the receiving account;

receiving, by the mail server from the receiving account, notification that the certified email message was filtered by the receiving account; and selectively notifying the sending account that the certified email message was filtered by the receiving account.

4. In a system for sending and receiving email using an interactive receiver and having at least one sending account and at least one receiving account, a method for providing certified email comprising the steps of:

receiving at a mail server configured to receive certified email messages a certified email message from the sending account;

storing the certified email message in a storage device associated with the mail server;

receiving a request from the receiving account to access the certified email message;

delivering the certified email message from the mail server to the receiving account;

receiving, by the mail server from the receiving account, notification that the certified email message was replied to by the receiving account; and selectively notifying the sending account that the certified email message was replied to by the receiving account.

5. In a system for sending and receiving email using an interactive receiver and having at least one sending account and at least one receiving account, a method for providing certified email comprising the steps of:

receiving at a mail server, configured to receive certified email messages, a certified email message from the sending account;

storing the certified email message in a storage device associated with the mail server;

receiving a request from the receiving account to access the certified email message;

delivering the certified email message from the mail server to the receiving account;

receiving, by the mail server from the receiving account, notification that the certified email message was forwarded by the receiving account; and selectively notifying the sending account that the certified email message was forwarded by the receiving account.

6. In a system for sending and receiving email using an interactive receiver and having at least one sending account and at least one receiving account, a method for providing certified email comprising the steps of:

receiving at a mail server, configured to store certified email messages, a certified email message from the sending account;

storing the certified email message in a storage device associated with the mail server;

receiving a request from the receiving account to access the certified email message;

delivering the certified email message from the mail server to the receiving account;

receiving, by the mail server from the receiving account, notification that the certified email message was saved by the receiving account; and selectively notifying the sending account that the certified email message was saved by the receiving account.

7. In a system for sending and receiving email using an interactive receiver and having at least one sending account and at least one receiving account, an apparatus for providing certified email comprising:

a memory having program instructions, and a processor configured to use the program instructions to perform the steps of:

using an interactive receiver to generate a certified email message from the sending account;

sending the certified email message to a mail server that is configured to store certified email messages;

storing the certified email message in a storage device associated with the mail server;

receiving a request from the receiving account to access the certified email message;

delivering the certified email message from the mail server to the receiving account;

receiving, by the mail server from the receiving account, notification of an action taken upon the certified email message by the receiving account; and selectively notifying the sending account of the action taken on the certified email message by the receiving account.

8. In a system for sending and receiving email using an interactive receiver and having at least one sending account and at least one receiving account, an apparatus for providing certified email comprising:

a memory having program instructions, and a processor configured to use the program instructions to perform the steps of:

receiving at a mail server, that is configured to store certified email messages, a certified email message from the sending account;

storing the certified email message in a storage device associated with the mail server;

receiving a request from the receiving account to access the certified email message;

delivering the certified email message from the mail server to the receiving account;

receiving, by the mail server from the receiving account, notification of an action taken upon the certified email message by the receiving account;

storing the notification in a database associated with the mail server; and selectively notifying the sending account of the action taken on the certified email message by the receiving account, whereby the interactive receiver is operative to receive broadcast information.

9. The apparatus of claim 8, wherein the receiving step further comprises the step of receiving notification that the certified email message was filtered.

10. The apparatus of claim 8, wherein the receiving step further comprises the step of receiving notification that the certified email message was replied to.

11. The apparatus of claim 8, wherein the receiving step further comprises the step of receiving notification that the certified email message was forwarded.

12. The apparatus of claim 8, wherein the receiving step further comprises the step of receiving notification that the certified email message was saved.

13. In a system for sending and receiving email using an interactive receiver and having at least one sending account and at least one receiving account, a computer-readable medium containing instructions for providing certified email, by:

using an interactive receiver to generate a certified email message from the sending account;

sending the certified email message to a mail server;

storing the certified email message;

receiving a request from the receiving account to access the certified email message;

delivering the certified email message from the mail server to the receiving account;

receiving, from the receiving account to the mail server, notification of an action taken upon the certified email message; and selectively notifying the sending account of the action taken on the certified email message by the receiving account.

14. In a system for sending and receiving email using an interactive receiver and having at least one sending account and at least one receiving account, a computer-readable medium containing instructions for providing certified email comprising the steps of:

receiving at a mail server a certified email message from the sending account;

storing the certified email message;

receiving a request from the receiving account to access the certified email message;

delivering the certified email message from the mail server to the receiving account;

receiving, by the mail server from the receiving account, notification of an action taken upon the certified email message by the receiving account;

storing the notification in a database associated with the mail server; and selectively notifying the sending account of the action taken on the certified email message by the receiving account, whereby the interactive receiver is operative to receive broadcast information.

15. In a system for sending and receiving email using an interactive receiver and having at least one sending account and at least one receiving account, a computer-readable medium containing instructions for providing certified email comprising the steps of:

receiving at a mail server a certified email message from the sending account;

storing the certified email message;

receiving a request from the receiving account to access the certified email message;

delivering the certified email message from the mail server to the receiving account;

receiving, by the mail server from the receiving account, notification that the certified email message was filtered by the receiving account; and selectively notifying the sending account that the certified email message was filtered by the receiving account.

16. In a system for sending and receiving email using an interactive receiver and having at least one sending account and at least one receiving account, a computer-readable medium containing instructions for providing certified email comprising the steps of:

receiving at a mail server a certified email message from the sending account;

storing the certified email message;

receiving a request from the receiving account to access the certified email message;

delivering the certified email message from the mail server to the receiving account;

receiving, by the mail server from the receiving account, notification that the certified email message was replied to by the receiving account; and selectively notifying the sending account that the certified email message was replied to by the receiving account.

17. In a system for sending and receiving email using an interactive receiver and having at least one sending account and at least one receiving account, a computer-readable medium containing instructions for providing certified email comprising the steps of:

receiving at a mail server a certified email message from the sending account;

storing the certified email message;

receiving a request from the receiving account to access the certified email message;

delivering the certified email message from the mail server to the receiving account;

receiving, by the mail server from the receiving account, notification that the certified email message was forwarded by the receiving account; and selectively notifying the sending account that the certified email message was forwarded by the receiving account.

18. In a system for sending and receiving email using an interactive receiver and having at least one sending account and at least one receiving account, a computer-readable medium containing instructions for providing certified email comprising the steps of:

receiving at a mail server a certified email message from the sending account;

storing the certified email message;

receiving a request from the receiving account to access the certified email message;

delivering the certified email message from the mail server to the receiving account;

receiving, by the mail server from the receiving account, notification that the certified email message was saved by the receiving account; and selectively notifying the sending account that the certified email message was saved by the receiving account.

19. In a system for sending and receiving email using an interactive receiver and having at least one sending account and at least one receiving account, an apparatus for providing certified email comprising:

means for generating a certified email message from the sending account;

means for sending the certified email message to a mail server capable of storing certified email messages;

means for storing the certified email message at the mail server;

means for receiving a request from the receiving account to access the certified email message;

means for delivering the certified email message from the mail server to the receiving account;

means for receiving, by the mail server from the receiving account, notification of an action taken upon the certified email message by the receiving account; and means for selectively notifying the sending account of the action taken on the certified email message by the receiving account.

* * * * *